Feb. 17, 1959    R. J. DAPP ET AL    2,873,854
GLASS TUBE AND CANE GAUGING AND SORTING APPARATUS
Filed June 8, 1954    10 Sheets-Sheet 1
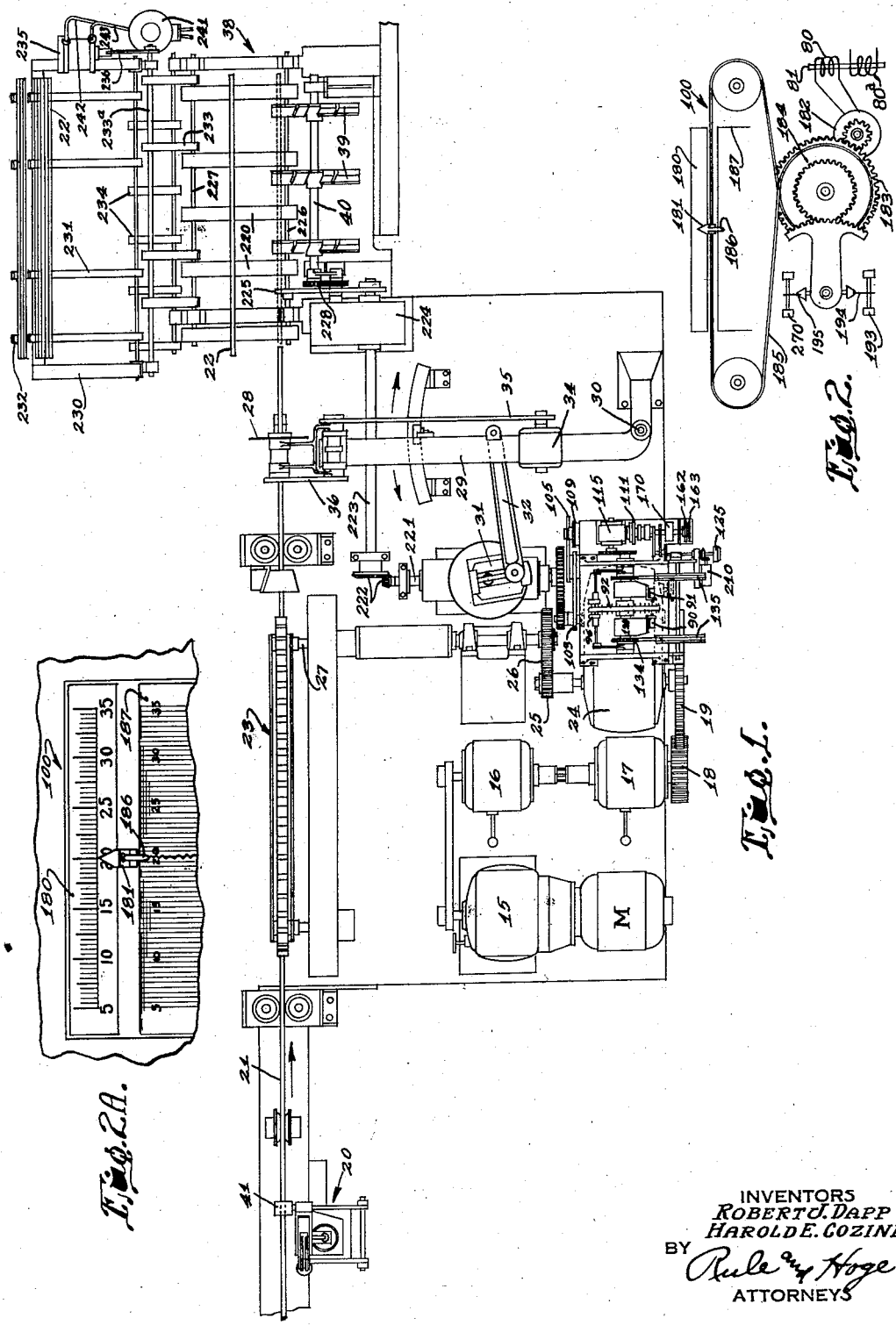
INVENTORS
ROBERT J. DAPP
HAROLD E. COZINE
BY
ATTORNEYS

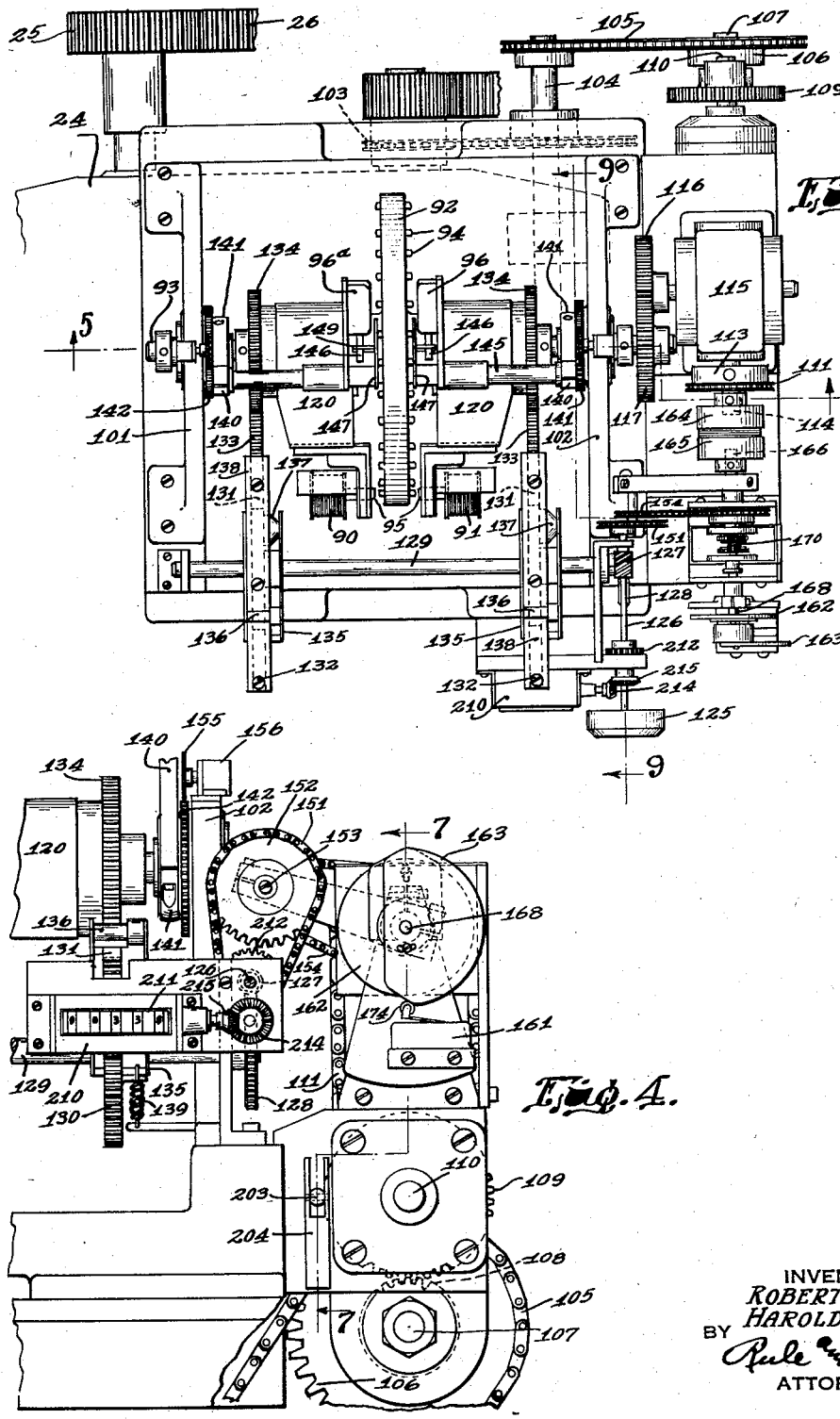

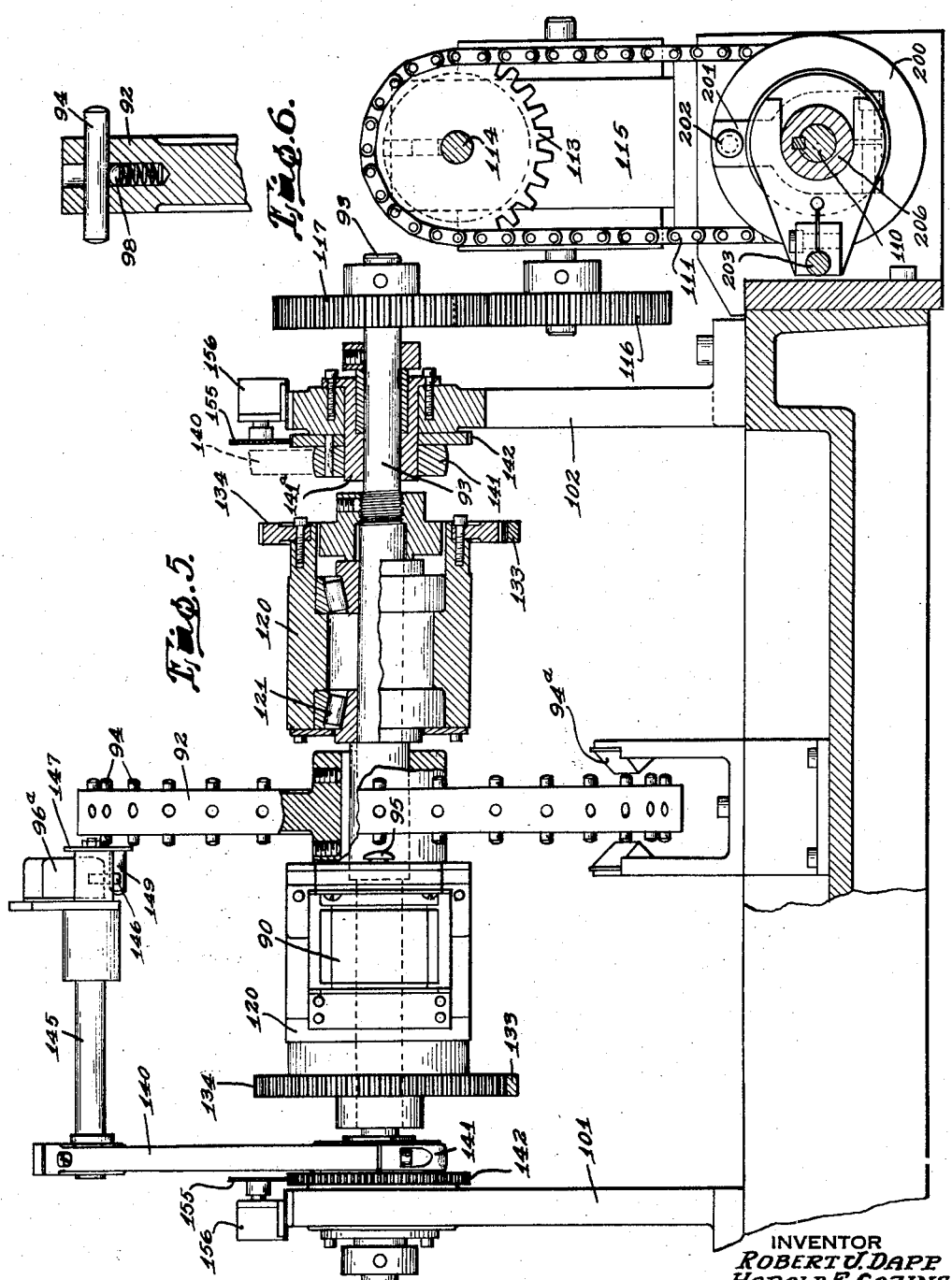

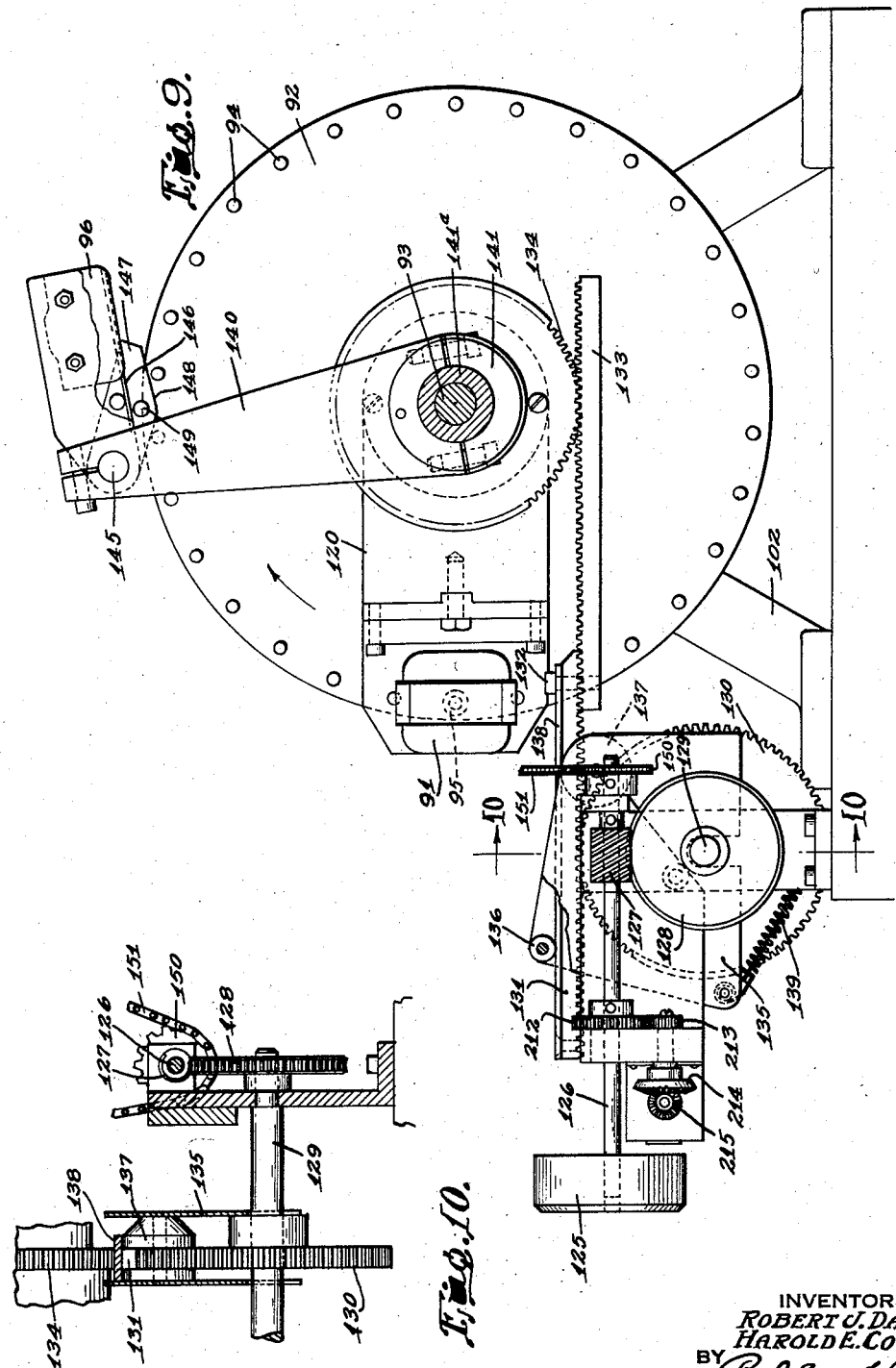

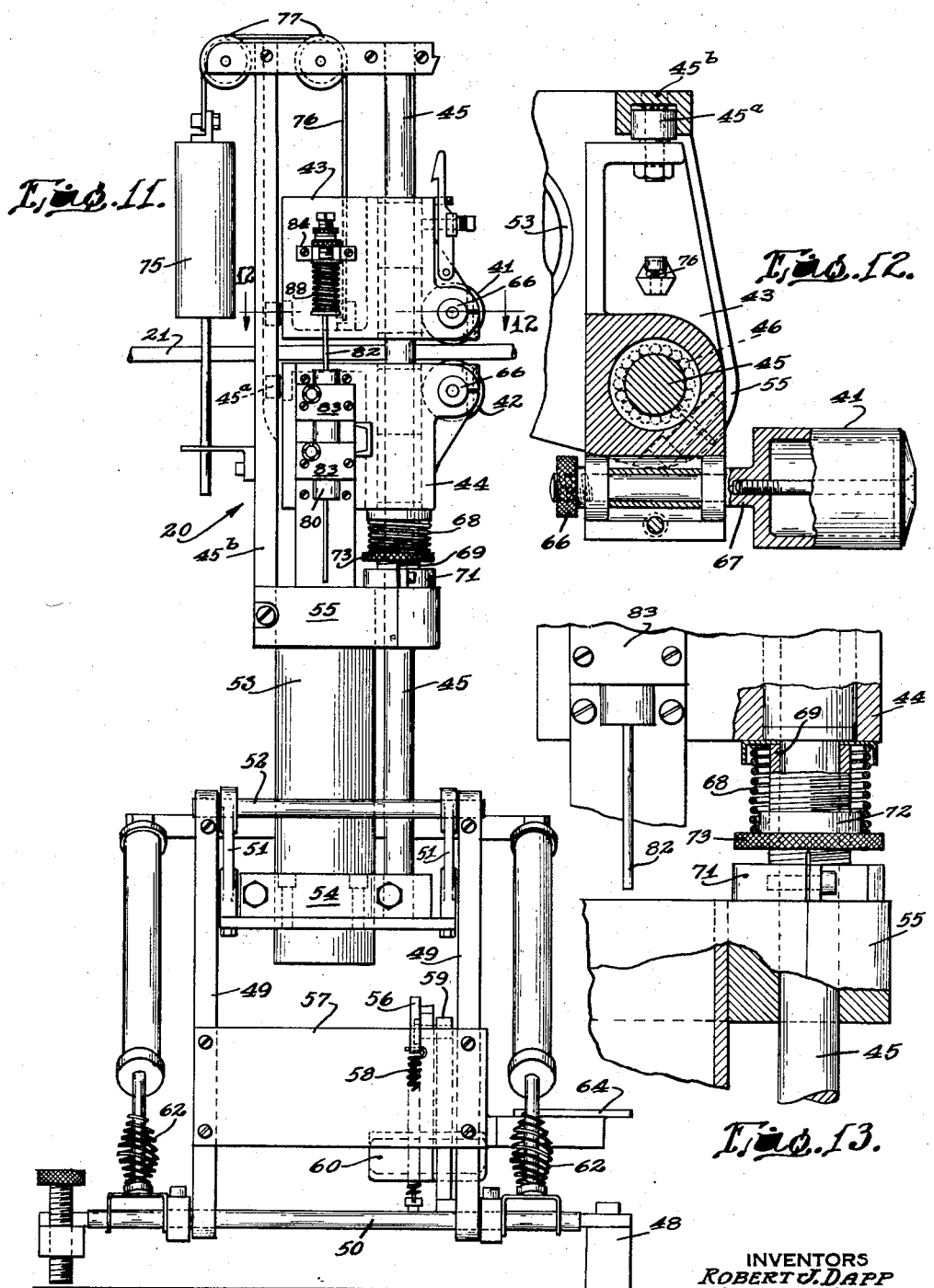

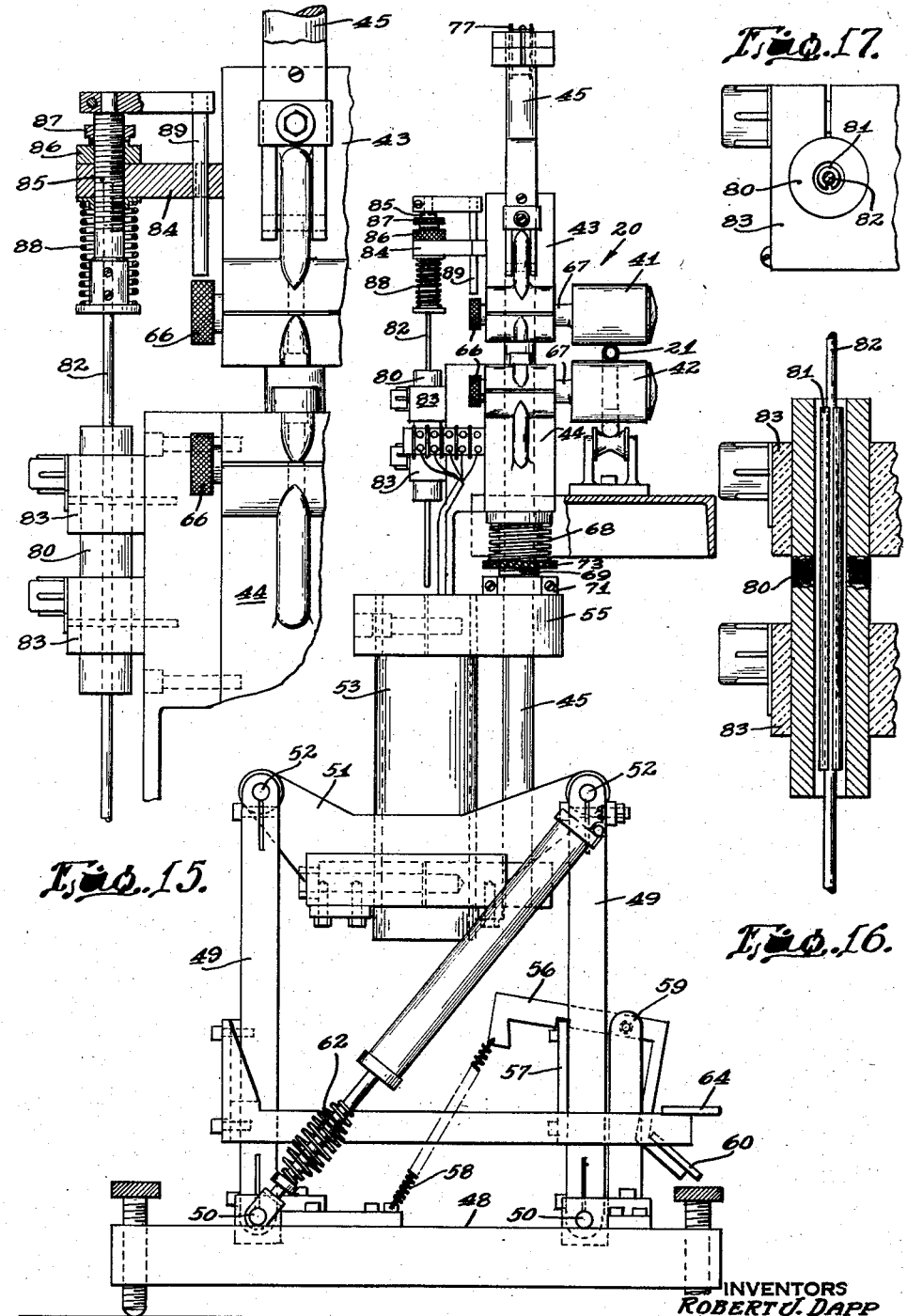

Feb. 17, 1959   R. J. DAPP ET AL   2,873,854
GLASS TUBE AND CANE GAUGING AND SORTING APPARATUS
Filed June 8, 1954   10 Sheets-Sheet 8

INVENTORS
ROBERT J. DAPP
HAROLD E. COZINE
BY
ATTORNEYS

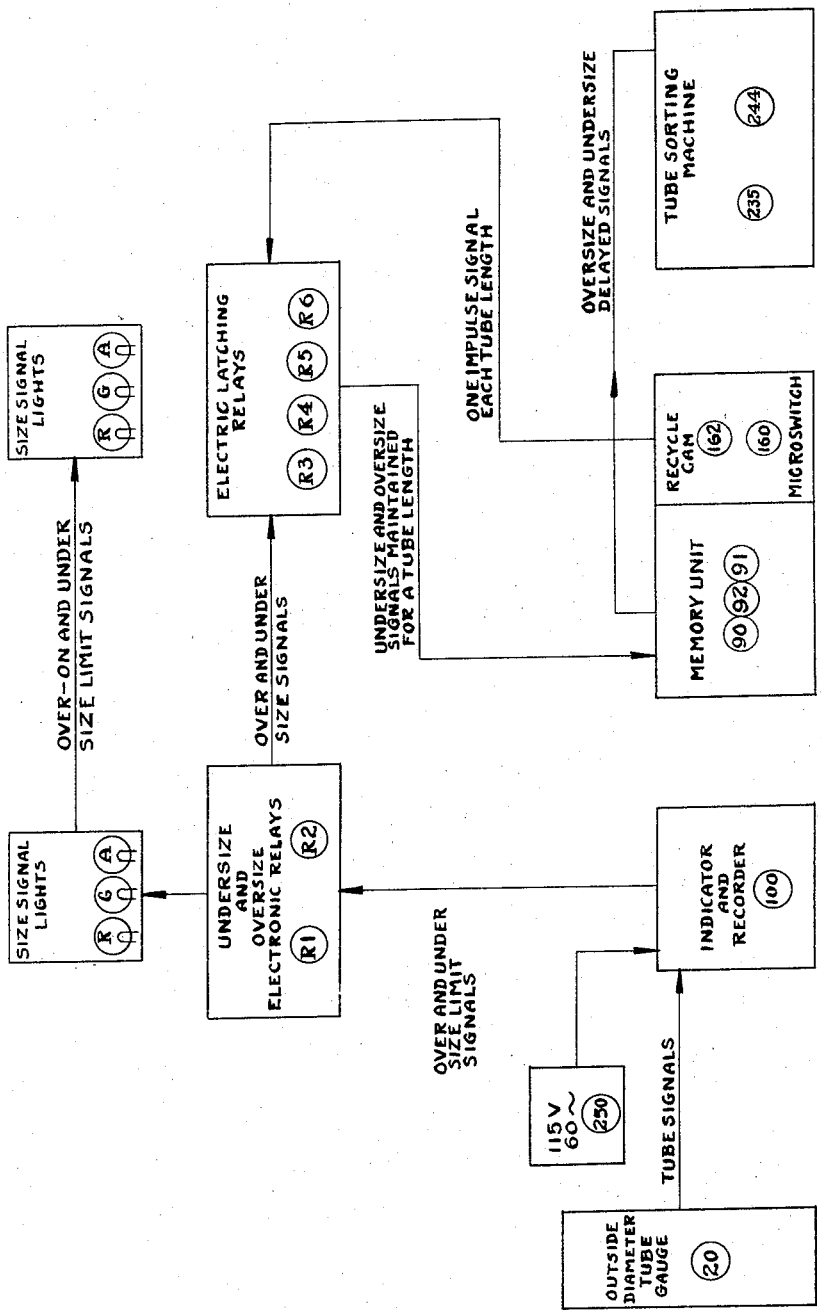

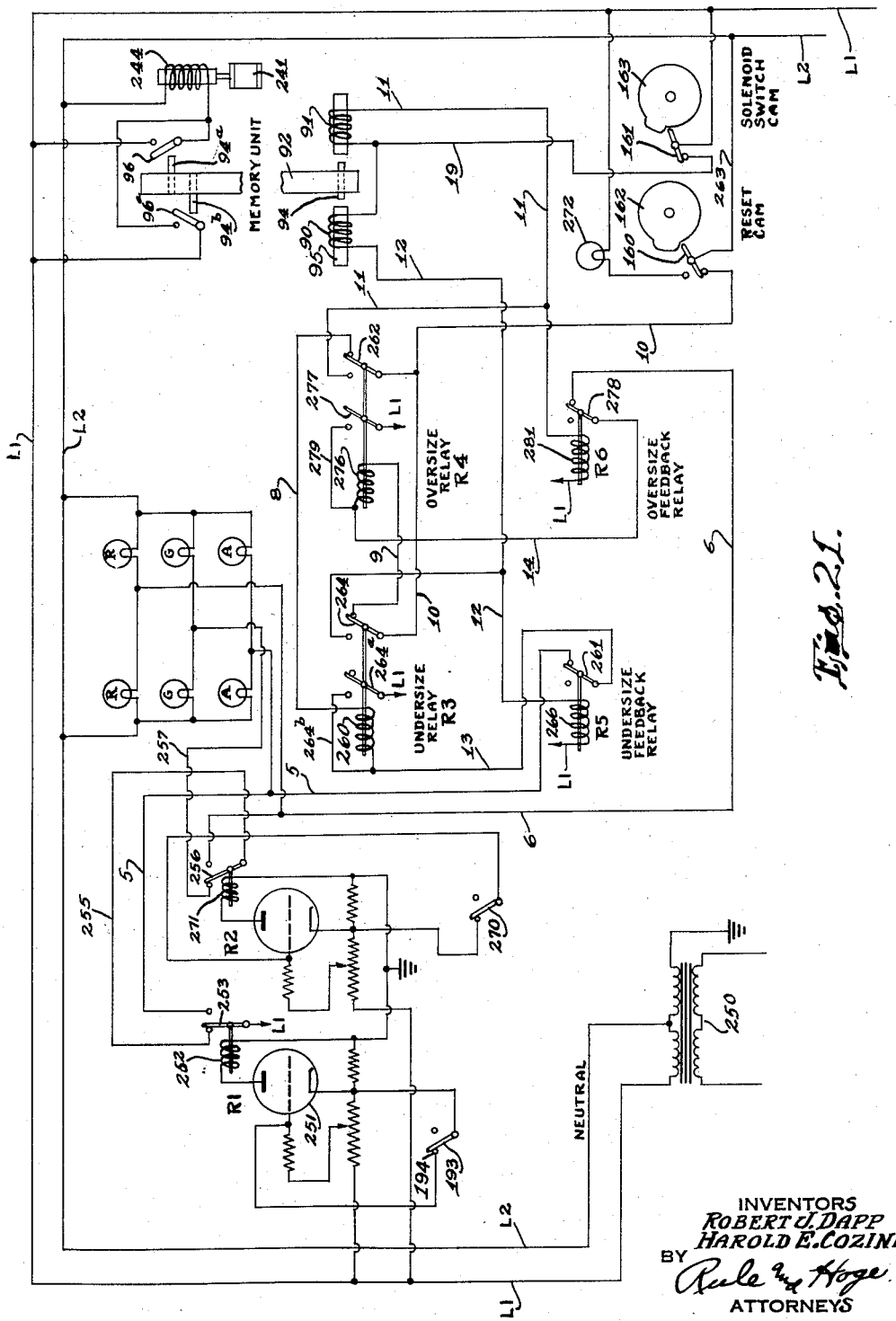

United States Patent Office 2,873,854
Patented Feb. 17, 1959

2,873,854

GLASS TUBE AND CANE GAUGING AND SORTING APPARATUS

Robert J. Dapp and Harold E. Cozine, Vineland, N. J., assignors to Owens-Illinois Glass Company, a corporation of Ohio Application June 8, 1954, Serial No. 435,336

5 Claims. (Cl. 209—88)

Our invention relates to gauging and sorting apparatus for measuring, indicating and recording the dimensions of articles which are brought in succession to a gauging means, and sorting the articles according to size or dimensions as indicated by the gauge. As herein illustrated and described the apparatus is particularly adapted for gauging the outer diameter of glass tubing or cane as it is continuously drawn, severing lengths or rods of the glass after the gauging, and sorting the severed rods or tubes according to size as indicated by the gauge. Glass tubes and solid rods or cane are commonly formed by continuously drawing the glass from a furnace tank or molten supply body, the glass being shaped as it leaves the supply body in a molten or plastic condition. The glass is drawn horizontally for a considerable distance to permit cooling and hardening, the individual sections or rods being severed in succession at the free end of the drawn glass.

The present invention provides a gauge, intermediate the furnace and the glass severing apparatus, by which the outside diameter of the cane or tubing as it travels through the gauge is continuously measured. A differential transformer associated with the gauge provides a signal or electric current which varies with the diameter of the glass and is transmitted to an indicating and recording device which indicates continuously and precisely, on a graduated scale, the diameter of the glass and also makes a continuous record of the same. If the exterior diameter of any portion of the tube passing through the gauge is either over or under a prescribed limit, a signal is transmitted from the indicator and recorder to an electric relay which in turn transmits the signal to a memory device. The latter stores the signal and, when the section of glass which is out of gauge is severed, actuates a sorting device by which the out-of-gauge rod or section is segregated from those whose diameters are within the prescribed limits.

The exact diameter of the tubing as it passes through the gauge is continually indicated, both on the indicator scale and on the recorder strip chart. Signal lights also constantly show whether the tubing is over, under or within the prescribed size limits.

In drawing glass either in the form of a tube or solid rod by the above method, the diameter is controlled by variable factors such as temperature and composition of the glass, atmospheric temperatures, rate of drawing, air pressure supplied for forming the tubing, etc. For many purposes the diameter of the glass rods or tubes must be accurately controlled and maintained within close tolerances. The present invention provides means for accurately indicating at all times the diameter of a glass as it is drawn and by continuously recording the diameter, indicates the trend of the pulling operation.

The apparatus is adjustable for severing rods or tubes of any desired length within certain limits, and also for adjustably controlling the diameter. The invention provides means operable manually when the length of the tubes being severed is adjusted, also to adjust the various control devices to correspond, as hereinafter set forth.

Referring to the accompanying drawings:

Fig. 1 is a partly diagrammatic view of an apparatus embodying the present invention;

Fig. 2 is a diagrammatic view of the indicator and recorder;

Fig. 2A is a fragmentary view of the recorder chart and indicator;

Fig. 3 is a plan view showing the memory device and associated parts including manually operated adjusting mechanisms;

Fig. 4 is a fragmentary elevational view showing a counter device, reset cams and certain driving mechanisms;

Fig. 5 is a part-sectional view at the line 5—5 on Fig. 3, showing the memory wheel and associated parts;

Fig. 6 is a fragmentary detail of the memory wheel;

Fig. 9 is a sectional elevation at the line 9—9 on Fig. 3, showing the memory wheel and means for adjusting parts associated therewith;

Fig. 10 is a section at the line 10—10 on Fig. 9;

Fig. 11 is a front elevational view of the gauge;

Fig. 12 is a section at the line 12—12 on Fig. 11 showing one of the gauging rolls;

Fig. 13 is a fragmentary view partly in section, with parts broken away, showing portions of the spring mechanism for loading a gauging roll;

Fig. 14 is a side elevational view of the gauging apparatus shown in Fig. 11;

Fig. 15 is a fragmentary view, partly in section, of a portion of the apparatus shown in Fig. 14;

Fig. 16 is a sectional view of the differential transformer forming a part of the gauging apparatus;

Fig. 17 is a plan view of the same;

Fig. 20 is a block diagram of the gauging and sorting apparatus, showing the flow of the various electrical signals; and Fig. 21 is a wiring diagram.

Figure 7:
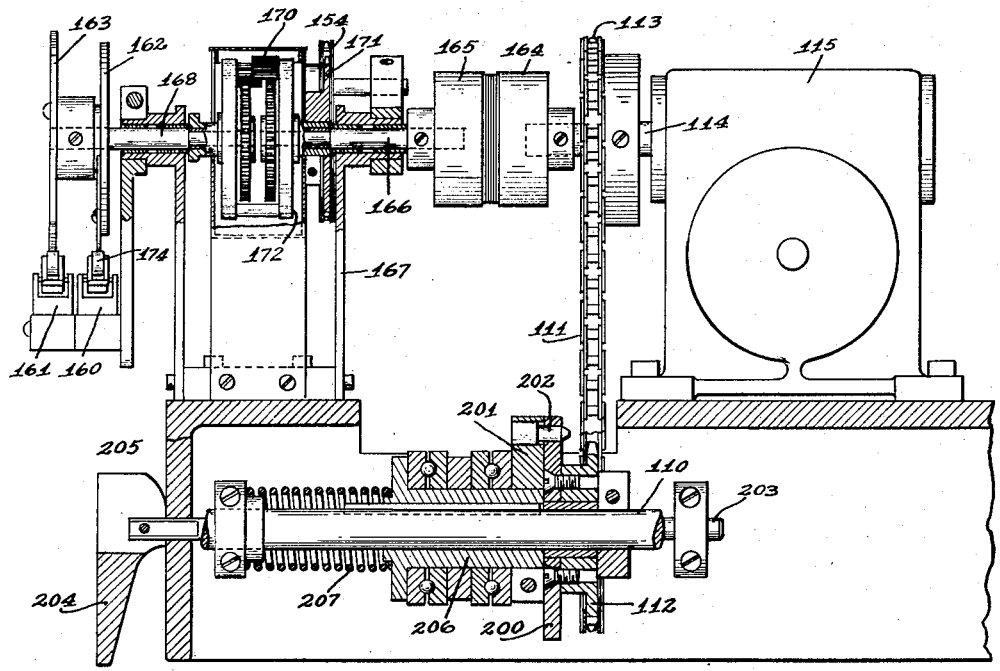
Fig. 7 is a sectional view at the line 7—7 on Fig. 4, showing particularly the recycle and solenoid cams, a train of gearing for actuating them and a clutch and its operating device.

Referring to Fig. 1 the apparatus comprises, in general terms, a gauge 20 by which the workpiece 21, which may be a glass rod or tube, is gauged as it is continuously drawn forward by drawing apparatus 23 comprising a pair of endless belts forming a caterpillar drive powered by an electric motor M operating through a train of gearing including variable speed transmission gears 15, 16, 17, gears 18, 19, gear reducer 24, gears 25, 26 and a drive shaft 27. A tube severing device comprises a circular saw 28 carried on an oscillating arm 29 mounted to swing about a pivot 30, and actuated by an adjustable eccentric 31 connected thereto through a link 32 for reciprocating the saw 28 and thus causing it to advance with the workpiece as it severs or scores the latter. The saw is driven by a motor 34 operating through a train of gearing including belts 35, 36. The leading end of the workpiece 21 before severance is advanced into the sorting apparatus 38 where a set of rotating star wheels 39 mounted on a shaft 40, strike the glass if only scored by the saw 28, thereby severing the rod or tube 22. The sorting apparatus operates as hereinafter described to sort the tubes according to their size in diameter as indicated by the gauging apparatus.

Referring to Figs. 11 to 17 the gauge includes a pair of gauging rollers 41 and 42 between which the glass tube 21 is continuously drawn in a horizontal direction. The rollers are mounted for free rotation about their horizontal axes in upper and lower supporting frames or carriers 43 and 44, respectively, said carriers being mounted for limited up-and-down sliding movement on a vertical rod 45. Roller bearings 46 (Fig. 12) permit substantially frictionless movement of the roller carriers 43, 44. Rotation of the carriers about the rod 45 is prevented by guide rolls 45ᵃ on the carriers, running in a guide channel in a channel bar 45ᵇ.

The gauging apparatus is mounted on a framework including a base 48, a swinging frame including upright parallel arms or links 49 which rock on pivots 50, and frame plates 51 connected by pivot rods 52 to the arms 49 at their upper ends. The plates 51 carry a vertical tubular post 53 attached thereto by clamping means comprising brackets 54. A block 55 is secured to the upper end of the post 53. The rod 45 is supported in the block 55.

The gauging rollers 41, 42 are movable laterally to an inoperative position at one side of the workpiece 21 by swinging the parallel links 49 about their pivots 50, said links being mounted to swing to the left as viewed in Fig. 14. They are normally held in upright position by a latch 56 engaging a tie plate 57 of the swinging frame. A coil spring 58 normally holds the latch in engagement with its keeper. The latch is pivoted to a stationary post 59 and carries a foot pedal 60 for releasing the latch. When the latch is released the gauging mechanism is moved to an inoperative position by a spring buffer device 62 of conventional construction. The apparatus is returned to operative position by means of a foot pedal 64.

The gauging rollers 41, 42 are removably mounted in the supporting frames 43, 44 as indicated in Fig. 12 and held in place by nuts 66 threaded on the roll spindles 67. The gauging rollers are adapted to bear continuously with a yielding or spring pressure against the traveling workpiece 21. An upward pressure is applied to the lower roller 42 by a coil spring 68 (Figs. 11 and 13) mounted on a sleeve 69. The sleeve is clamped to the rod 45 by a split collar 71 and is threaded externally to receive an adjusting nut 72. The spring is held under compression between the knurled adjusting knob 73 and the frame 44. The tension on the spring 68 is adjusted to carry the weight of the carrier 44 and apply a light upward pressure of the roll 42 against the tube 21. The weight of the carriage 43 for the upper roller 41 is partly counterbalanced by a counterweight 75 connected by a cord 76 to the carriage 43, said cord running over guide rolls 77, so that the roller bears with a light downward pressure against the tube 21.

The gauging apparatus includes a differential transformer comprising a solenoid 80 (Fig. 16) and a core 81. The transformer may be energized in a conventional manner by applying an alternating voltage to a primary coil 80ᵃ (Fig. 2). The core 81 is in the form of a split tube made of magnetic iron and cemented or secured to a carrying rod 82. The solenoid 80 has a fixed connection with the frame 44 through split bearing blocks 83 of insulating material. The rod 82 is connected to the roller frame 43 by a bracket 84 on the frame and a screw threaded adjusting rod 85 extending through an opening in the bracket. The rod 85 is adjustable up and down through the bracket 84 by an adjusting nut 86 threaded on the rod 85 and seated on the bracket. A lock nut 87 holds the parts in adjusted position. A coil compression spring 88 applies a downward force to the adjusting rod for holding the nut 86 seated on the bracket. A guide rod 89 extending through an opening in the bracket and slidable up and down therein, holds the adjusting rod against rotative movement during adjustment.

The relative up-and-down movement of the transformer coil and its armature, produced by any variations in the diameter of the workpiece or rod 21 as the latter travels between the rolls, correspondingly varies the electrical output of the transformer. This output signal is continuously transmitted to the recorder 100 (Figs. 2A and 19) which continually indicates the diameter of the rod passing through the gauge rolls.

The recorder may be a standard strip chart recorder of the null-balance type, but with certain modifications and additions adapting it for use as a part of the present invention. The recorder comprises a scale 180 (Fig. 2A) with graduated scale markings and an indicator pointer 181 which may indicate directly the diameter of the glass tube, for example, in millimeters. Operating connections between the differential transformer and the pointer 181, as shown in Fig. 2, comprise a motor 182 connected to be driven by the output of the transformer coil 80. The motor 182 is connected through a train of gearing 183 to a drum 184 which drives the belt 185 carrying the indicator pointer 181. The position of the pointer is determined by the current output of the transformer coil 80, which output varies with changes in the relative positions of the coil and its armature and at all times directly indicates on the scale the diameter of the workpiece passing through the gauge. The recorder includes a stylus 186 by which a continuous record is made on the chart 187. The chart is driven by clockwork and is provided with scale markings corresponding to those on the scale 180.

Figures 18, 19:
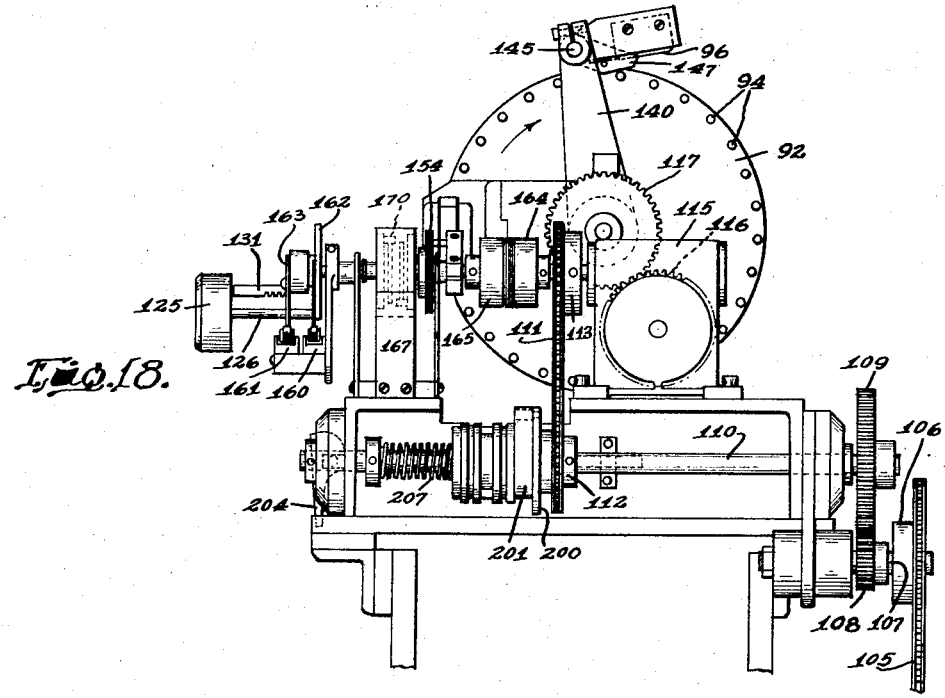
Fig. 18 is an end elevational view of a portion of the mechanism shown in Fig. 3.
Fig. 19 is a perspective view of the strip chart recording instrument.

Referring to Fig. 19, which shows the recorder with the top lifted to open position, pointers 188 and 189 indicate respectively the permissible undersize and oversize limits of the tube diameter. These pointers are connected to cables 190 trained over cable drums 191 which may be rotated by adjusting knobs 192 for adjusting the pointers. The drums are operatively connected to contact bars 193 and 270 cooperating with contact elements 194 and 195 (Fig. 2) in circuit with the electronic relays R1 and R2 (Fig. 21) which transmit signals to the memory device as hereinafter described. The construction comprising the adjustable size limit pointers 188, 189 and contact mechanism including the contact bars 193, 270 and cooperating contact elements 194, 195, is old and well known in the prior art.

The signals from the electronic relays are transmitted to the signal impulse solenoids 90, 91 mounted at opposite sides of the memory wheel or disk 92 (Figs. 3, 5 and 9). The wheel 92 is keyed to drive shaft 93 journalled in standards 101 and 102. Contact pins 94 are mounted in the memory wheel for sliding movement lengthwise into and out of switch operating positions as presently described. As the memory wheel is rotated the pins 94 are brought in succession into a position in line with the armatures 95 of the solenoids 90, 91. When one of these solenoids is energized its armature is projected into engagement with a pin 94 and moves the latter into position to actuate one of a pair of delayed signal switches 96, 96ᵃ. As shown in Fig. 6 the pins 94 are frictionally held by spring-loaded friction rolls 98.

The memory wheel is rotated continuously at a constant speed to bring a contact pin 94 in line with the solenoid cores 95 during each tube cutting cycle. As shown there are thirty equally spaced pins mounted in the memory wheel. The pins 94 are reset from operating position to neutral position by stationary cams 94ᵃ (Fig. 5).

The memory wheel is driven by the motor M through a train of gearing extending through the speed reduction gear 24 (Figs. 1 and 3). The gear train includes a chain belt 103 driven from the speed reducer 24, shaft 104 driven by the belt 103, a chain belt 105 which drives the sprocket wheel 106 (Fig. 4) keyed to a shaft 107, a pinion 108 (Figs. 4 and 18) on shaft 107 driving a gear 109 on a shaft 110, and a chain belt 111 trained over sprocket wheels 112 and 113 (Figs. 7 and 5) mounted respectively on the shaft 110 and a shaft 114. The sprocket wheel 113 is keyed to the shaft 114 which drives the speed reduction gear 115 (Figs. 5 and 3). A gear 116 driven from the speed reducer 115 drives a gear 117 keyed to the memory wheel shaft 93.

The signal impulse solenoids 90, 91 are mounted in arms or carriers 120 journalled with anti-friction bearing rolls 121 (Fig. 5) for adjustment rotatively about the axis of the memory wheel. The position of the solenoids is adjusted relatively to the delayed signal switches 96, 96$^a$ to correspond to the number of lengths of tubing or cane between the gauge and the cutter, as hereinafter described.

The means for adjusting the solenoids 90, 91 (and certain other parts, as hereinafter described) comprises a hand-operated adjusting knob 125 on a shaft 126 to which is secured a worm 127 (Figs. 9 and 10) driving a worm wheel 128 keyed on a shaft 129. Gears 130 on the shaft 129 drive a pair of racks 131 bolted at 132 to racks 133 running in mesh with gears 134 bolted to the solenoid carrier frames 120. Means for holding the racks 131 and 133 in engagement with their respective gears, include frames 135 each comprising a pair of parallel plates mounted to rock on the shaft 129. Rollers 136 and 137, journalled in the frames 135, bear respectively on the upper and lower faces of strips 138 attached to the racks 131. Coil tension springs 139 operate through the frames 135 and rolls 136 and 137 to hold the racks in operative position.

The delay signal switches 96, 96$^a$ operated by the pins 94, are mounted on arms 140 adjustable rotatively about the axis of the shaft 93. The arms 140 are formed with split bearing hubs 141, clamped in adjusted position to stationary bearing sleeves 141$^a$ (Figs. 5, 9) to which are attached gears 142. The switches 96, 96$^a$ are mounted on horizontal rods 145 on the arms 140 and are actuated by leaf springs 146 (Fig. 9). A rock arm 147 mounted to swing on the rod 145, is formed with a cam surface 148 which extends into the path of any contact pins 94 which have been set by the solenoids 90 or 91. When the arm 147 is lifted by a pin 94, a lug 149 on said arm operates through the spring 146 to close the switch.

Referring to Fig. 7, a recycle switch 160 which operates to reset the electrical control apparatus after each cycle of operations, as hereinafter described, and a solenoid switch 161, also operated during each cycle, are actuated respectively by a recycle cam 162 and a solenoid switch cam 163. These cams are driven by the shaft 114 operating through a coupling 164, 165. The shaft 166 to which the coupling member 165 is connected, is mounted in a frame 167 in which is also journalled the shaft 168 on which the cams 162 and 163 are mounted. Rotation of the shaft 166 is transmitted through a differential gearing 170 to the shaft 168. A retiming sprocket wheel 171 loose on the shaft 166, is connected to the member 172 in which the differential gears are journalled and when rotated as presently described, operates to rotatively adjust the positions of the cams 162, 163. These cams make one complete rotation during each cycle of operations. The cam disks 162, 163 or cam lobes thereon are rotatively adjustable and engage rolls 174 for operating the switches 160, 161.

A manually operated clutch mechanism (Figs. 5, 7 and 18) is provided for connecting and disconnecting the shaft 110 to and from the gear 112 which drives the chain 111 and the speed changer 115. The clutch element or disk 200 is attached to the gear 112, loose on the shaft 110. The clutch member 201 carries a pin 202 to engage the clutch disk 200. The disk 201 is connected through a rod 203 to a hand lever 204 formed with an eccentric 205. A sleeve 206 splined on the shaft 110 is fixed to the clutch member 201. A compression spring 207 holds the clutch members together. The hand lever 204 is operable to disconnect the clutch elements allowing the shaft 110 to run idly so that the reducer 115, the memory wheel and the resetting cams 162 and 163 are disconnected from their driving means.

Operating connections between the adjusting knob 125 and the retiming sprocket wheel 171 are as follows:

Referring to Figs. 3, 4, 9 and 10, a gear 150 (Fig. 10) keyed to the shaft 126, drives a sprocket chain 151 trained over the gear 150 and a gear wheel 152 on a shaft 153. A sprocket chain 154 is trained over a sprocket wheel on the shaft 153 and the retiming sprocket wheel 171 (Fig. 7). Rotation of the adjusting knob 125 operates through such train of gears to adjust the cams 162 and 163 in synchronism with the adjustment of the memory wheel solenoids as above described.

Gear wheels 142 (Fig. 5), attached to the arms 140, run in mesh with pinions 155 geared to indicators or counters 156 which serve to indicate the position to which the solenoids 90, 91 are adjusted. These indicators may show directly on a scale the number of cycles from the time of setting of a pin 94 to the time of operation of the delayed signal switch 96 or 96$^a$ by such pin.

The adjusting knob 125 is operatively connected to a counter 210, as for example, a Veeder-Root counter (Fig. 4) having scale markings 211 which may be graduated to indicate directly the time, during a cycle, at which the recycle switch is operated. The connections between the adjusting knob 125 and the counter are shown in Figs. 3, 4 and 9. They include a gear 212 keyed to the shaft 126 and driving a pinion 213 which drives intermeshing gears 214 and 215. The gear 215 is mounted on the shaft of the counter 210.

Figure 8:
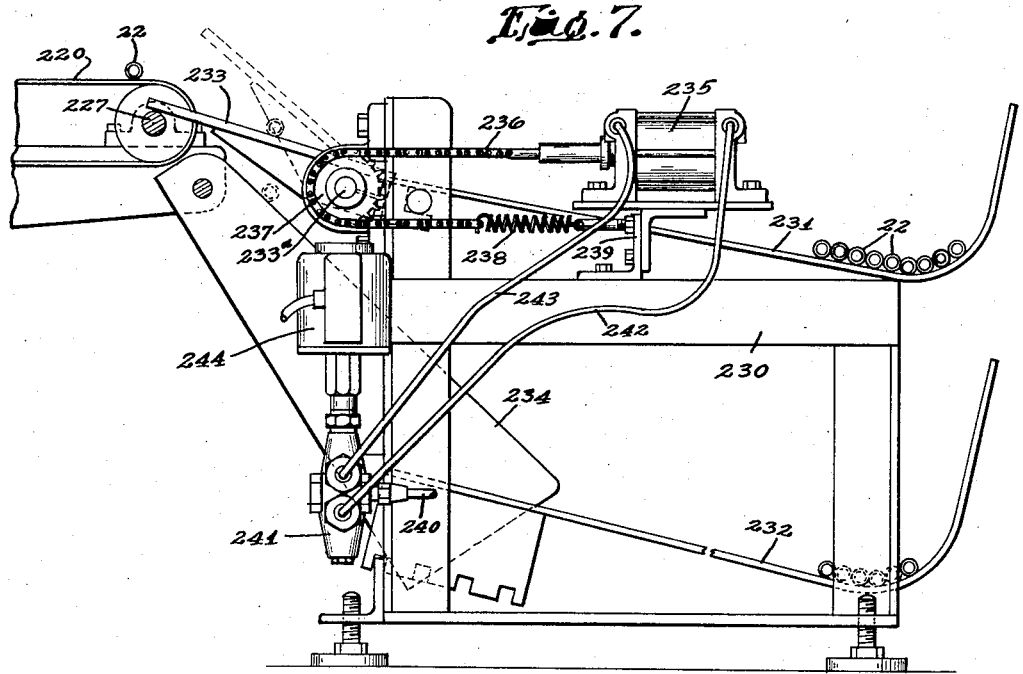
Fig. 8 is an elevational view of a sorting apparatus.

The sorting apparatus, shown in Figs. 1 and 8, operates to segregate the tubes which fail to pass the test, namely, those of greater or less diameter than the permissible diameter for which the apparatus is set, from those tubes which pass the test. This apparatus includes horizontally disposed endless belt carriers 220 which are continuously driven by a power shaft 221 operating through gearing 222, shaft 223, gearing within a gear box 224, belt 225 and a shaft 226. The belt conveyors 220 are trained over pulleys on the shaft 226 and a driven shaft 227.

The tubes 22 are brought into position over the conveyors 220 before being severed by the cutter 28 and paddles or wheels 39 which operate as heretofore described. The wheels 39 are driven by gearing in the gear box 224 operating through gears 228 to drive the shaft 40.

The sorting bin comprises a frame 230 on which are mounted an upper rack 231 to receive the tubes which pass the gauging test and a lower rack 232 to receive the off-size tubes. The tubes, if of the normal size, run off the conveyors 220 onto an inclined gate or switch comprising arms 223 over which the tubes roll by gravity to the upper rack 231. The arms 233 are attached to a rockshaft 233$^a$ pivotally mounted to swing the arms upward from the full line position (Fig. 8) to the broken line position for bypassing the defective tubes, allowing them to run down inclined guide members 234 to the lower rack 232.

The gate 233 is swung up and down by an air-operated piston motor 235 mounted on a bracket 239 on the frame 230. The motor piston is connected to a chain 236 trained over a sprocket wheel 237 fixed to the shaft 233$^a$. The chain 236 is connected by a tension spring 238 to the bracket 239. Air under pressure for operating the motor 235 is supplied through a pressure pipe 240 to a motor control valve 241 from which pipes 242, 243 extend to the motor. The valve is actuated by an electromagnet 244. The electromagnet is under the control of the time delay apparatus, and is automatically actuated as a defective tube is brought to the sorting apparatus.

The apparatus is set according to the required gauge and length of tubes as follows:

The recorder 100 (Fig. 19) is adjusted for the desired gauge or tube diameter by adjusting the pointers 188 and 189 along the scale to the positions indicating the minimum and maximum permissible diameters respectively. The cutter mechanism is adjusted to score or sever the required tube lengths by adjusting the eccentric 31 (Fig. 1) and thereby adjusting the amplitude of the reciprocating movement of the cutter disk 28. The motor (not shown) for driving the eccentric and oscillating the cutter carrying arm 29 is adjusted for operating the arm at the desired speed, such adjustment compensating for the change in speed and amplitude of oscillation due to the adjustment of the eccentric 31.

The distance from the gauge rollers 41, 42 to the saw cutting position of the cutter 28 is measured and the distance divided by the length of the tubes which are to be cut. This gives a certain whole number of tube lengths and usually an additional fraction of a tube length. The adjusting knob 125 is then operated to set the counter 210 to indicate such number and fraction. This operation of the knob 125 also serves to adjust the signal impulse solenoids 90, 91 of the memory device so that the number of tube cutting cycles between the solenoids and the time delay swtiches 96, 96ª corresponds with the number for which the counter 210 is set. This number is indicated, as in Fig. 9, by the number of spacings of the pins 94 between the solenoid 91 and switch 96. The adjustment of the knob 125 also operates, as heretofore pointed out, to adjust the position of the retiming sprocket wheel 171 (Fig. 7). This operates through the differential 170 to rotatively adjust the cams 162, 163 which make one complete rotation during each tube cutting cycle, thereby adjusting the time during such cycle that the recycle switch 160 and solenoid switch 161 are actuated.

The block diagram (Fig. 20) illustrates the sequence of operations during a cycle. As here indicated the tube gauge 20, which measures the outside diameter of the tube, sends signals to the indicator and recorder 100 when the tube diameter is outside of the prescribed limits. The indicator 100 transmits the oversize and undersize signals to the electronic relays R1 and R2 respectively. These relays control the circuits for the signal lights R, G and A, maintaining a green light while the tube is of normal gauge and giving amber and red lights for undersize and oversize respectively. Any desired number of such signal lights may be installed at any desired locations, two sets of these lights being indicated on the diagram. The relays R1 and R2 transmit signals for under and oversize tubes, to the electric latching relays comprising the undersize relay R3, oversize relay R4, undersize feedback relay R5 and oversize feedback relay R6. Signals from the relays R3, R4 are transmitted to the signal impulse solenoids 90 and 91 of the memory unit. The latter stores the signals and later transmits them to the tube sorting machine comprising the electromagnet 244 controlling the operation of the air motor 235. At the completion of each cycle, the recycle cam 162 operates the switch 160 for resetting the control circuits.

Referring to the wiring diagram (Fig. 21), electric current for operating the solenoids 90, 91 and the various relays and other parts of the control mechanism, is supplied through a transformer 250. The electrical circuits extend between the mains L1 and L2 extending from the secondary winding of the transformer. Electronic relays R1 and R2 receive signals from the recorder 100 when the tube is oversize or undersize. These relays in turn establish circuits for the solenoids 90 and 91, under the control of relays R3 and R4.

The operation is as follows:

The tubing 21 is continuously drawn at a constant speed by the caterpillar drive 23 (Fig. 1) and severed into tubes of uniform length by the cutter 28 or the cutter in cooperation with the star wheels 39. The tubing, as it is drawn, passes between the gauge rolls 41 and 42, spring held against the tube and which respond to any variations in the tube diameter. The solenoid 80 and core 81 of the differential transformer, being connected to move up and down with the respective rolls 41 and 42, a voltage which varies with variations in the diameter of the tubing, is supplied to the motor 182 (Fig. 2) which is geared to the indicator pointer 181 of the recorder. The pointer indicates directly on the scale 180 (Fig. 2A), the diameter of the tubing, and the stylus 186 operates to make a continuous record of the tube diameter.

If the tubing is undersize the motor 182 operates to break the signal circuit of the relay R1 at the contact 193 (Figs. 2 and 21). While the tubing, which is being gauged, is within the prescribed limits the switch 193 remains closed so that the electron tube 251 conducts. The relay magnet coil 252, in the plate circuit is thus energized and holds the switch 253 in the closed position as shown. When the signal circuit is opened at the contact 193, as above noted, the current flow in the plate circuit of the tube 251 is stopped and the switch 253 reversed. This establishes a circuit for the amber lights A, such circuit being through the lead 5 and lamps A to the neutral line L2. The reversal of the switch 253 also opens the circuit for the green lamps G which are thus extinguished. The circuit for the lamps G, which remain lighted while the gauge of the tubing is within the required limits, extends from switch 253 through lead 255, switch 256, and lead 257 to the lamps G.

The reversal of the switch 253 also makes a circuit for the solenoid 260 of the undersize relay R3. This circuit extends from the main L1 through the switch 253, lead 5, switch 261 of the undersize feedback relay R5, lead 13, coil 260, lead 8, switch 262 of the oversize relay R4, lead 10, recycle switch 160 and lead 263 to main L2. The coil 260 being thus energized operates switches 264 and 264ª. The switch 264 completes the circuit for the signal impulse solenoid 90 of the memory unit. This circuit extends from the main L1 through the switch 161 (in circuit with the solenoids 90, 91 and herein referred to as the solenoid switch), lead 19, solenoid 90, lead 12, switch 264, lead 10, recycle switch 160 and lead 263 to main L2. The operation of the switch 264ª when the coil 260 is energized closes a bypass 264ᵇ which provides a holding circuit for the coil, independent of the switches 253 and 261.

The solenoid 90 being energized sets a contact pin 94 to the operative position 94ª for later operation of the time delay switch 96. When the undersize tube reaches the sorting bin, the contact pin which has been set, closes the time delay switch 96. This completes the circuit for the solenoid 244 which actuates the valve 241 (Fig. 8) thereby causing the piston motor 235 to lift the gate 233 so that the undersize tube is discharged onto the lower rack 232.

The operation of the switch 264 by the undersize relay coil 260 as above described, also completes a circuit for the solenoid 266 of the undersize feedback relay R5. This circuit extends from the main L1 through coil 266, lead 12, switch 264, lead 10, recycle switch 260 and lead 263 to main L2.

The coil 266 being thus energized reverses the switch 261. At the completion of the cycle the cam 162 momentarily reverses the recycle switch 160. This opens the circuit through the relay coil 260 and resets the control apparatus for the next cycle. The operation of the switch 160 also operates to momentarily light a signal lamp 272.

The operation of the apparatus for detecting, indicating and segregating a tube section of oversize diameter is substantially the same as above described in connection with a section of undersize, except that the circuits are controlled by different relays, namely, the electronic relay R2, oversize relay R4 and oversize feedback relay R6. If a tube section is oversize in diameter as it passes through the gauge, the signal is transmitted through the indicator 100 which opens the circuit at the switch 270 (Fig. 21), transmitting the signal to the relay R2. As this stops the current flow in the plate circuit of the electron tube, the solenoid 271 in said circuit is de-energized and the switch 256 accordingly reversed. This breaks the circuit through the green lamps and makes a circuit through the red lamps R, indicating the oversize tube section. The reversal of the switch 256 also makes a circuit for the solenoid coil 276 of the oversize relay R4. This circuit may be traced from the main L1 through switch 253, lead 255, switch 256, lead 6, switch 278 of the oversize feedback relay R6, lead 14, coil 276, lead 9, switch 264, lead 10 and recycle switch 160. The coil 276 being thus energized, reverses the switch 262 and a switch 277. The latter closes a bypass circuit 279 which bypasses the switches 278 and 256. The reversal of the switch 262 makes the circuit for the solenoid 91 of the memory unit. This circuit may be traced from main L1 through the solenoid switch 161, lead 19, coil 91, lead 11, switch 262, lead 10 and recycle switch 160 to main L2. The solenoid 91 being thus energized, moves a contact pin 94 to the operative position 94b so that it operates later to close the switch 96a, making a circuit for the solenoid 244. This effects the operation of the motor 235 (Fig. 8) for lifting the switch gate 233 and discharging the oversize tube to the lower rack 232. Although in the particular form of apparatus shown, the oversize and undersize tubes are directed to the same rack 232, the switch 96a, controlled by the oversize tubes, might be used to control the operation of separate means for discharging or segregating the oversize tubes from the undersize tubes as well as from the perfect tubes.

The operation of the oversize relay coil 276 as above described, makes a circuit for the solenoid 281 of the oversize feedback relay R6. This circuit extends from the main L1 through coil 281, lead 11, switch 262, lead 10 and recycle switch 160 to main L2. The coil 281 therefore reverses the switch 278. When the recycle cam 162 reverses the switch 160, the circuit for the relay solenoid 276 is broken, and the apparatus reset for the next succeeding cycle.

The term "rod" as herein used refers to tubes as well as solid rods or cane except as otherwise indicated. The term "diameter" refers in all instances to the exterior diameter of the rods or tubes.

Modifications may be resorted to within the spirit and scope of our invention.

We claim:

1. The combination with means for drawing a rod horizontally in the direction of its length, of apparatus for gauging the diameter of the rod, said apparatus comprising a pair of gauging rolls, carriers individual to the rolls and on which the rolls are mounted respectively above and below the rod, a support on which the carriers are slidably supported one over the other and guided for relative up-and-down movement by which the rolls are relatively movable toward and from each other, means for applying a yielding pressure of the rolls against the rod as the latter advances between the rolls, said last mentioned means including spring means for applying an upward pressure to the lower carrier and gauging roll and a counterbalance connected to the upper carrier and applying an upward force thereto by which downward pressure of the upper gauging roll against the said rod is reduced, a differential transformer comprising a solenoid and its armature having fixed connection respectively with the said carriers for relative up-and-down movement therewith and operable to give an electric signal variable with the variations in the relative positions of the carriers, said armature comprising a vertical rod extending through the solenoid.

2. Apparatus for gauging a continuously drawn glass rod, said apparatus including a gauge through which the rod is drawn, means actuated by the gauge to give an electrical signal when a dimension of the rod falls outside of a prescribed limit, a memory wheel mounted for rotation about its axis, an annular series of contact pins mounted on said wheel and uniformly spaced circumferentially of the wheel, an electromagnet comprising a solenoid and its armature, said electromagnet being mounted for rotative adjustment about the axis of said wheel and with the armature adjacent to the path of the contact pins, means for rotating the memory wheel and thereby bringing the pins in succession into position to be actuated by the said armature, means actuated by the signal from the gauge for operating the electromagnet, a time delay switch mounted in position to be actuated by any contact pin set by the electromagnet, means for severing the rod into individual lengths, the time delay switch being positioned beyond the electromagnet a distance corresponding to the number of lengths of rod between the gauge and the severing means, means for adjusting and timing the operation of the severing means for adjustably varying the length of the severed rods, means for adjusting the electromagnet to positions relative to the time delay switch corresponding to said number of lengths of rod, said adjusting means including a manually operated adjusting device, an indicator, and operating connections between the adjusting device and indicator to indicate the position of the adjustment of the electromagnet.

3. The apparatus defined in claim 2, said adjusting means including a hand knob and a train of gearing between said knob and memory wheel comprising a rack and pinion, and a train of gearing between said knob and the said indicator.

4. Apparatus for gauging a continuously drawn glass rod, said apparatus including a gauge through which the rod is drawn, means actuated by the gauge to give an electrical signal when a dimension of the rod falls outside of a prescribed limit, a memory wheel mounted for rotation about its axis, an annular series of contact pins mounted on said wheel and uniformly spaced circumferentially of the wheel, an electromagnet comprising a solenoid and its armature, said electromagnet being mounted for rotative adjustment about the axis of said wheel and with the armature adjacent to the path of the contact pins, means for rotating the memory wheel and thereby bringing the pins in succession into position to be actuated by the said armature, means actuated by the signal from the gauge for operating the electromagnet, a time delay switch mounted in position to be actuated by any contact pin set by the electromagnet, means for severing the rod into individual lengths, the time delay switch being positioned beyond the electromagnet a distance corresponding to the number of lengths of rod between the gauge and the severing means, means for adjusting and timing the operation of the severing means for adjustably varying the length of the severed rods, means for adjusting the electromagnet to positions relative to the time delay switch corresponding to said number of lengths of rod, said adjusting means including a manually operated adjusting device, an electric signal transmitting system for transmitting the said signal and including said solenoid, a solenoid cam, means for rotating the cam in synchronism with the movements with the memory wheel, and a switch in said electric system operated by the solenoid cam for resetting the solenoid.

5. The combination set forth in claim 4, said electric system comprising a recycle switch, a recycle cam, means for driving the recycle cam in synchronism with the rotation of the memory wheel, and means providing operating connections between the said manually operated adjusting device and the said cams for adjusting the cams when said manually operated adjusting device is operated for adjusting the said electromagnet.

References Cited in the file of this patent

UNITED STATES PATENTS

| | | |
|---|---|---|
| 1,876,396 | Butterfield | Sept. 6, 1932 |
| 2,007,840 | Terry | July 9, 1935 |

(Other references on following page)

UNITED STATES PATENTS

| | | |
|---|---|---|
| 2,217,342 | Ladrach | Oct. 8, 1940 |
| 2,487,628 | Aller | Nov. 8, 1942 |
| 2,305,816 | Sonnberger | Dec. 22, 1942 |
| 2,306,211 | Geiss | Dec. 22, 1942 |
| 2,312,357 | Odquist et al. | Mar. 2, 1943 |
| 2,339,289 | Olken | Jan. 18, 1944 |
| 2,363,577 | Dexter | Nov. 28, 1944 |
| 2,433,557 | Hurley | Dec. 30, 1947 |
| 2,474,802 | Poole | June 28, 1949 |
| 2,609,095 | Graham et al. | Sept. 2, 1952 |
| 2,629,490 | Bailey | Feb. 24, 1953 |
| 2,659,182 | Argyle | Nov. 17, 1953 |
| 2,684,473 | Shannon | July 20, 1954 |
| 2,701,470 | Ames | Feb. 8, 1955 |

FOREIGN PATENTS

| | | |
|---|---|---|
| 54,104 | France | Nov. 6, 1947 |